United States Patent Office 2,914,449

Patented Nov. 24, 1959

2,914,449

LOW RESISTANCE CONTACTS TO GERMANIUM

Simon Ernst Mayer, London, England, assignor to International Standard Electric Corporation, New York, N.Y., a corporation of Delaware No Drawing. Application May 19, 1954
Serial No. 430,973

Claims priority, application Great Britain June 4, 1953

2 Claims. (Cl. 204—37)

This invention relates to low resistance contacts to germanium and methods of making such contacts. It has, in the past, proved difficult to make low-resistance and particularly non-rectifying contacts to germanium by soldering or similar means, as the germanium oxide film always present, is not reduced at normal soldering temperatures and is not readily soluble in most fluxes. Methods are known for soldering to germanium using fluxes of the zinc chloride, ammonium chloride type, but these methods do not permit even tinning of a germanium surface in any reliable way.

Methods have also been described for copper plating germanium surfaces prior to soldering using a copper pyrophosphate bath but it was found from work on rectifiers that such contacts result in forward resistances of several ohms per square cm. even under the most favourable conditions, which is often not permissible.

The method that has now been developed, consists in deposition by electro-plating on the germanium surface of a 65% tin, 35% nickel alloy in the form of the metastable compound nickel stannide, followed by heating of this compound at a temperature in the region of 250–300° C. This heating releases tin in an active form all over the surface, allowing alloying to be obtained everywhere, so that the resulting contact will have a resistance of small fractions of an ohm per square cm. The preferred plating bath for this purpose is a fluoride bath, but many other known types of baths, e.g. chloride baths, can also be used for this purpose.

If the plating is applied to etched surfaces, no measurable carrier injection takes place, but if roughened surfaces are used on high resistivity germanium, considerable carrier injection is obtained so that such contacts are particularly suitable for the reverse contact of rectifiers and the like, where low forward resistance is dependent on carrier injection and carrier storage.

For making connection to the plated surface, it is preferable to tin the nickel tin-alloy coating with any convenient soft solder process and this tinning may be combined with tin heating operation for releasing the tin in the alloy if a temperature in the range 250–300° C. is used.

In carrying out the invention a plating bath, as described in "Tin-Nickel Alloy Plating" issued by the Tin Research Institute in March 1952, and consisting of the following composition may be used, the ingredients being dissolved in the order given:

| | Grams/litre |
|---|---|
| $SnCl_2.2H_2O$ | 50 |
| Ammonium bifluoride | 35 |
| Sodium fluoride | 28 |
| $NiCl_2.6H_2O$ | 300 |

The temperature of the bath should be maintained at about 65° C. and the pH of the bath maintained at about 2.5 by means of hydrochloric acid and nickel carbonate.

Anodes of pure tin and pure nickel are placed side by side and spaced a distance of one to two inches from the germanium crystal cathodes such that the current is divided between the tin and nickel anodes in the ratio of from 1:1 to 3:2. A current density of 10 ma. per square centimetre, requiring a voltage of 2 to 3 volts, for a period of 10 minutes gives a satisfactory deposit thickness of nickel stannide of about .0005 inch.

It will be obvious that the rate and thickness of the deposit may be varied as desired but a minimum thickness of .0001 inch should be used.

Ordinary soft solder is applied to the electro-deposit in order to build it up in thickness so that a soldered connection may be made to it. Resin or other inert flux may be used for this purpose.

The germanium crystal with its built up deposit is now heated, preferably in hydrogen gas to a temperature of about 500° C. The presence of the hydrogen gas prevents any oxidisation occurring and actually reduces at 500° C. any germanium oxide which may be present. At the same time tin from the nickel stannide is released on to the surface of the germanium beneath the plating layer to form a contact of very low resistance. It is only necessary to maintain the germanium at a temperature of 500° C. for a few moments.

While the principles of the invention have been described above in connection with specific embodiments, and particular modifications thereof, it is to be clearly understood that this description is made only by way of example and not as a limitation on the scope of the invention.

What I claim is:

1. A method of making electrical connection to a surface of germanium crystal comprising depositing metastable nickel stannide on the germanium surface by electro-plating, heating the deposit to a temperature of about 250° C.–300° C. to release tin from the stannide over the germanium surface, and coating the surface of the deposit with soft solder to which a soldered connection can be made.

2. A method as claimed in claim 1 and in which the nickel stannide is deposited from a fluoride plating bath.

References Cited in the file of this patent

UNITED STATES PATENTS

| | | |
|---|---|---|
| 2,454,270 | Branusdorf | Nov. 23, 1948 |
| 2,555,001 | Ohl | May 29, 1951 |
| 2,560,792 | Gibney | July 17, 1951 |
| 2,658,866 | Parkinson | Nov. 10, 1953 |
| 2,694,040 | Davis et al. | Nov. 9, 1954 |
| 2,733,390 | Scanlon | Jan. 31, 1956 |
| 1,781,481 | Armstrong | Feb. 12, 1957 |
| 2,784,300 | Zuk | Mar. 5, 1957 |

OTHER REFERENCES

Tiley et al.: "Electrochemical Techniques for Fabrication of Surface Barrier Transistors," Proceedings of the I.R.E., vol. 41, No. 12, December 1953, pp. 1706–1708.